United States Patent Office 3,508,318
Patented Apr. 28, 1970

3,508,318
MACHINE FOR CRIMPING BATTERY INTERCELL CONNECTORS
William R. Clingenpeel, Middleburg Heights, Philip C. Hungerford, Jr., Cleveland Heights, Robert R. Hayes, Euclid, and Thomas W. Jennens, Eastlake, Ohio, assignors, by mesne assignments, to ESB Incorporated, Philadelphia, Pa., a corporation of Delaware
Filed June 5, 1967, Ser. No. 643,632
Int. Cl. H01m 35/18; H01r 43/04; B23p 19/04
U.S. Cl. 29—204                                    6 Claims

ABSTRACT OF THE DISCLOSURE

A machine for crimping intercell connectors through the partition of battery containers. The crimping provides a liquid-tight seal between the connector and the partition to prevent intercell leakage of electrolyte. The machine's crimping jaws are caused to engage the intercell connectors by means which move the battery container horizonally to a point beneath the jaws and by means for elevating the container so that the intercell connector is positioned between the jaws.

Cross-references to related applications

This application is related to the following other applications:

(1) "Machine for Casting Battery Intercell Connectors and Terminal Posts," Ser. No. 643,574, filed June 5, 1967 by William R. Clingenpeel et al.;

(2) "Method for Casting Battery Intercell Connectors," Ser. No. 643,702, filed June 5, 1967 by Charles J. Lund; and, (3) "Machine Used in Electrically Testing Battery Intercell Connectors and Terminal Posts," Ser. No. 643,631, filed June 5, 1967 by William R. Clingenpeel et al.

All four applications have common ownership.

Background of the invention

Before the inventions disclosed in the related and co-pending applications listed above, battery intercell connectors which extended through the partition were made by inserting some type of precast lug into the partition hole and later crimping and/or heating the lug to attach it to a mating piece and thus complete the intercell electrical connection.

The first two related applications listed above disclose and claim a machine and method for casting a molten intercell connector through the partition hole rather than using a precast, solid lug. While the molten metal might fill the hole with sufficient tightness to prevent intercell leakage of electrolyte, still it might be desirable to crimp the connector after it solidifies to increase the tightness of fit as an added precaution against leakage. Such crimping would preferably be done soon after the casting, while the metal is still hot.

By replacing the pouring mechanism with a crimping mechanism, the casting machine referred to above may be modified to perform the crimping operation. The application is directed to such a crimping machine.

SUMMARY OF THE INVENTION

This invention provides a machine which automatically crimps an intercell connector so that the connector is pressed tightly into both sides of the partition and/or the portion of the connector extending through the partition is expanded to fit tightly into the hole. While the machine is related to one used to cast molten intercell connectors and would thus be normally used with such connectors, this machine may be used to crimp connector lugs which have been precast outside the partition and inserted through the partition.

BRIEF DESCRIPTION OF THE DRAWINGS

FIGURE 15 is a top view of a six cell automobile battery before the cover is placed on.

DESCRIPTION OF THE PREFERRED EMBODIMENT

Before beginning a discussion of the machine which is the subject of this application, it is in order to give a brief description of a typical battery on which the machine might perform its operations.

Figure 15:
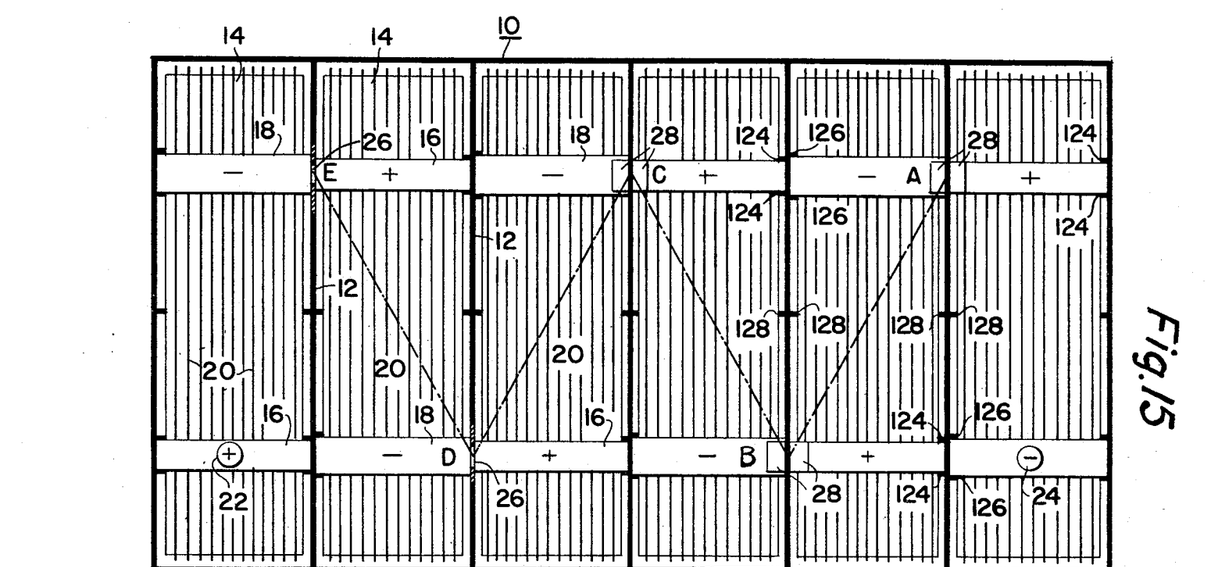
Figure 16:
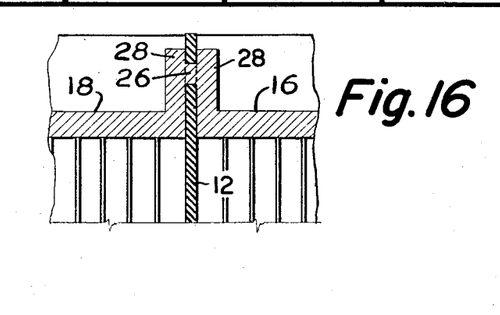
FIGURE 16 is a section elevation showing the intercell connector extending through the partition, before the crimping is done.

FIGURE 15 shows a six cell automobile battery after the terminal posts and intercell connectors are constructed but before the cover of the battery is applied. The drawing shows a container 10 having partitions 12 which divide the space inside the container into six compartments 14. Inside each compartment is a series of negative and positive plates, alternatively spaced and separated from one another by suitable separators. Extending across the compartments, and electrically connecting all positive plates with one another and all negative plates with one another are positive and negative connecting straps 16 and 18, respectively. Collectively the plates, separators, and connecting straps constitute cell elements 20. Also, extending upward from their respective straps are positive and negative terminal posts 22 and 24, respectively. Inasmuch as all of this is typical of conventional battery construction, no elaborate explanation will be given, and the drawing shows the plates and separators schematically represented by lines. Also shown in FIGURE 15 are the intercell connectors 28 extending through holes 26 in the partitions. FIGURE 16 shows in cross-section an intercell connector 28 extending through a partition hole 26 before the crimping is done.

Figure 1:
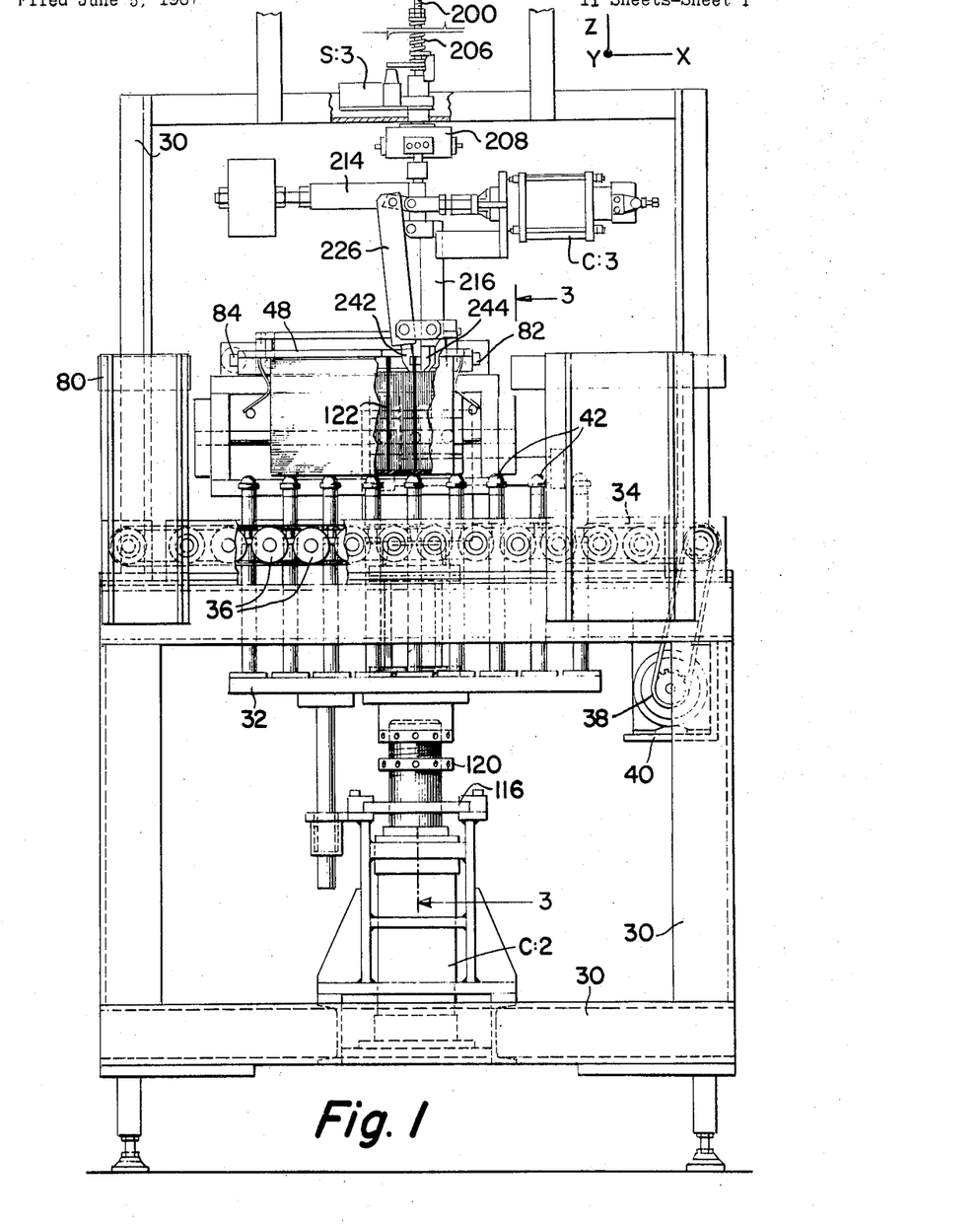
FIGURE 1 is a front elevation of the machine.
Figure 2:
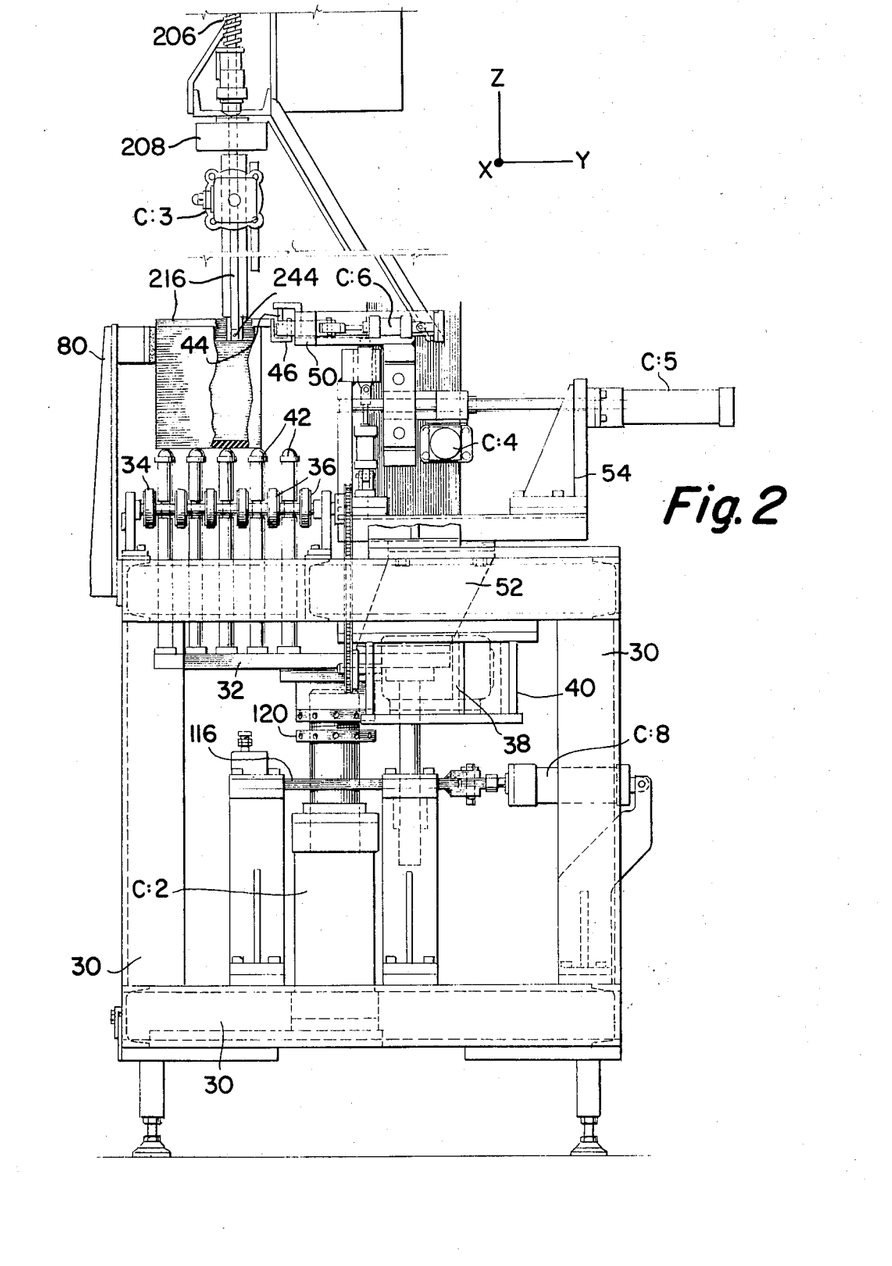
FIGURE 2 is a side elevation of the machine with the battery in its fully elevated position.

Since the crimping of the intercell connectors is work which must be done inside the battery container, it is necessary either to move the battery crimping mechanism or, conversely, move the crimping mechanism to the battery. The machine shown in the drawings moves the battery to the crimping mechanism, and in so doing requires movement along all three of the principle axes. For convenience, these axes are labeled "X," "Y," and "Z," and are defined as shown in FIGURES 1 and 2.

The machine (FIGURES 1 and 2) includes a frame 30 on which the functional parts are mounted. At the bottom and near the center of the machine is a hydraulic or air cylinder C:2, to the vertical piston of which is mounted a table 32. Mounted in the frame 30 is a series of horizontally aligned belts 34 (FIGURES 1, 2, 3, and 6) which move over pulleys 36 and which are driven by a combination electric motor and speed reducer mechanism 38 attached by a bracket 40 to the frame 30. These belts assist in moving the battery into the desired position for connector crimping and will normally constitute a segment of a longer conveyor system, the remaining portions of which lead to and from the machine and are not shown in the drawings.

To provide vertical movement to the battery, a series of risers 42 (FIGURES 1, 2, 3, and 6) are mounted on the table 32 and spaced between the belts 34 and their associated pulleys 36. The movements of the parts of the machine are programed in such a manner that the piston of cylinder piston C:2, and consequently the risers 42, are lowered when the battery is being received, but afterward rise to elevate the battery to the proper level for intercell connector crimping. To facilitate horizontal movement of the battery, each riser is provided at its top with a ball caster.

In addition to the vertical movement, the machine must also impart horizontal motion to the battery. Although with sufficient crimpers the machine could crimp all intercell connectors simultaneously, the machine shown in the drawing crimps only one intercell connector at a time, and in the process of crimping all five intercell connectors will move the battery horizontally along the W-shaped path shown in FIGURE 15; to facilitate later discussion, the five points of this letter "W" will be designated as points "A," "B," "C," "D" and "E." The horizontal motion is transmitted to the battery cam followers 44 (FIGURES 2 through 4) which lock into position in the U-shaped channel 46 of a jig plate 48 fitting over the top of the battery, as shown in FIGURES 2 through 6 and FIGURES 18 and 19. The cam followers 44 are rigidly secured to a horizontally movable cam plate 50 which is suspended above the table 32 by means of a support bracket 52. a U-shaped bracket 54, and other associated parts whose operation will be described in detail later.

Figure 7:
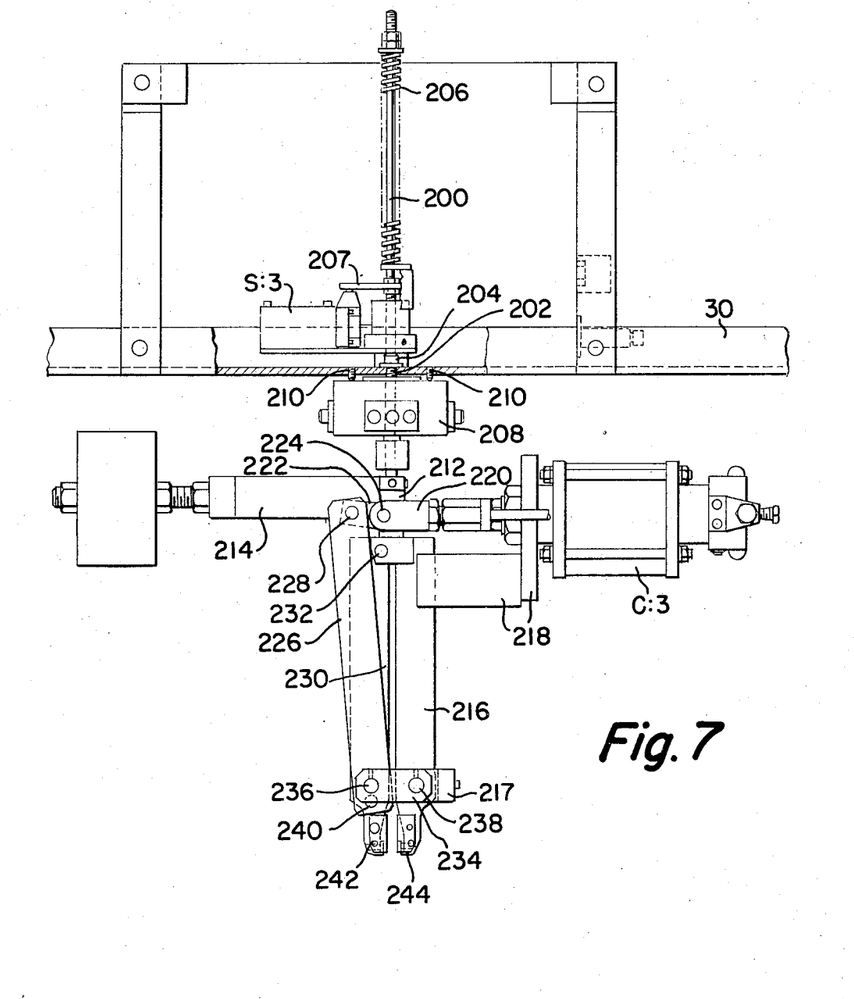
FIGURE 7 is a front elevation view of the crimping mechanism of the machine.

The intercell connector is crimped by a mechanism suspended from the frame 30, as shown in FIGURE 7. Suspension is achieved by a rod 200 which extends up through a hole 202 in the frame 30 and which is connected to a ball and socket 204 above the frame 30. The upper end of rod 200 extends upward through a compression spring 206. Extending outward from rod 200 is a small arm 207 which normally engages a switch S:3. Beneath frame 30 the rod 200 passes through a centering block 208 which can be used to position the crimping jaws properly by adjusting set screws 210. At the bottom of rod 200 is a connecting piece 212, to the left of which extends a counterbalancing arm and weight 214. From the bottom of connecting piece 212 a rigidly fixed crimping arm 216 extends downward; a link 217 is rigidly attached to the bottom of arm 216. To the right of connecting piece 212 is cylinder C:3, suspended by a bracket 218 attached to arm 216 and by yoke 220 attached to a pivot link 222. The piston of cylinder C:3 extends through bracket 218 and yoke 220. The pivot link 222 is pivotably connected at its one end to the end of the cylinder's piston and at its other end to arm 226 by means of pivot pin 228. At the bottom of connecting piece 212 there is a second crimping arm 230, connected to piece 212 by means of pivot pin 232. A link 234 connects arm 226 to the link 217 on arm 216 by means of pivot pins 236 and 238, respectively; the link 234 rotates with respect to pin 238 and is free to move with respect to arm 230. By means of a connecting pin 240 the arm 226 is connected to arm 230. A movable crimping jaw 242 is attached to the bottom of crimping arm 230; a stationary crimping jaw 244 is mounted on the bottom of crimping arm 216.

With the construction features described above in mind, the operation of the crimping mechanism can be described. Before the crimping can be performed the jaws 242 and 244 must be positioned around the intercell connector on both sides of the partition. This is accomplished when the risers 42 elevate to their final height, in the process of which the partition and intercell connector will be moved to between the jaws 242 and 244. Before the battery completes its rise, the bottoms of the jaws 242 and 244 will come to rest on the tops of the connecting straps 16 and 18 so that the last portion of the battery's rise will lift the entire crimping mechanism, in the process of which arm 207 will disengage switch S:3 and cause cylinder C:3 to function. When cylinder C:3 functions its piston will move outward (from right to left in FIGURE 7), moving pin 228 outward and causing arm 226 to rotate about pin 236; this in turn causes arm 230 to rotate about pin 232, since pin 240 is connected to both arms 226 and 230.

Attention is directed toward pin 240, which rotates about both pins 236 and 232. It will be observed that the radius of a circular arc in which pin 240 might rotate about pin 236 is much smaller than the circular radius of the arc in which pin 240 rotates about pin 232. If pin 240 were to move in a circular arc about pin 236, then for a given length of horizontal movement, pin 240 would move a greater distance vertically in its arc about pin 236 than it would in its arc about pin 232; since this situation obviously cannot exist, the path of pin 240 with respect to pin 236 is modified to something other than a true circular arc by permitting link 234 to rotate about pin 238 and move with respect to arm 230 so that pin 236 may move vertically with respect to pin 240.

While any mechanism capable of crimping the intercell connector may be used in the machine, the mechanism described in detail above is particularly advantageous because it combines the leverage or mechanical advantage of applying a force at pin 228 and rotating about pin 236 with the advantageous flat arc trajectory achieved by rotating pin 240 about pin 232, which flat arc trajectory causes a nearly normal force to be applied to the intercell connector by jaw 242. The arms and connections of the crimping mechanism described above may summarily be described as follows: a first crimping arm 216 is connected at its upper end with the upper end of a second crimping arm 230 by a first pivot pin 232, which second crimping arm 230 may rotate with respect to the first crimping arm 216 about first pivot pin 232; an additional arm 226 connected near its lower end with the lower end of the second crimping arm 230 by a second pivot pin 240; a link 234 connected to first crimping arm 216 by a third pivot pin 238 and to the additional arm 226 above the second pivot pin 240 by a fourth pivot pin 236, the link 234 being able to rotate with respect to the third or fourth pivot pins 238 and 240 and being also able to move with respect to the second crimping arm 230; and, means for applying a force to the upper end of the additional arm 226 so as to cause the additional arm 226 to rotate about the fourth pivot pin 236.

Before describing the sequence of motions of the machine, it should be stated generally that these motions are produced by cylinders which are activated when associated switches are closed, tripped, or triggered. There must, of course, be some circuitry connecting the switches with the cylinders. Since these circuits may be electrical, air, or hydraulic and since numerous circuits accomplishing the same net result might be devised, no specific circuit diagram will be shown. Instead such terms as "triggering switch X causes cylinder X to function" or "cylinder X functions in response to the action of switch X" will be used, these terms being understood to imply that there is an appropriate circuit of some type between the switch and the cylinder.

Figure 5:
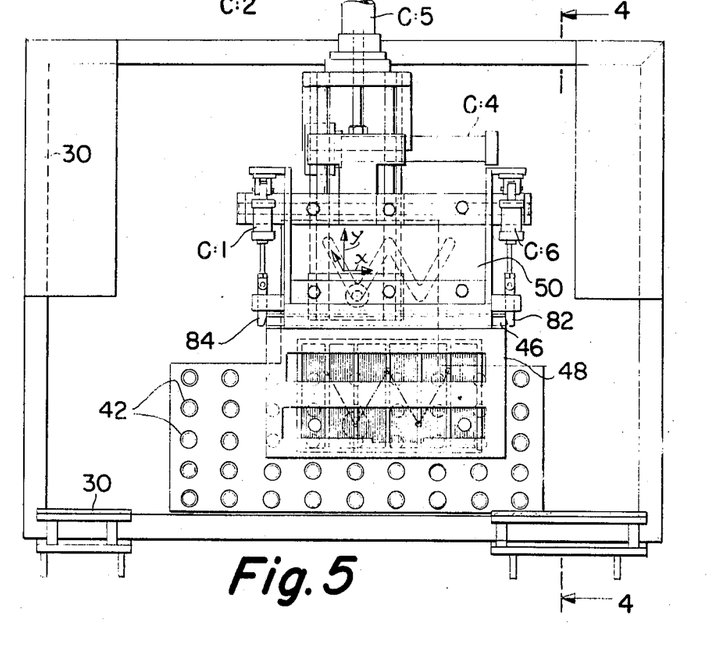
FIGURE 5 is a plan view of the portion of the machine shown in FIGURE 4.
Figure 6:
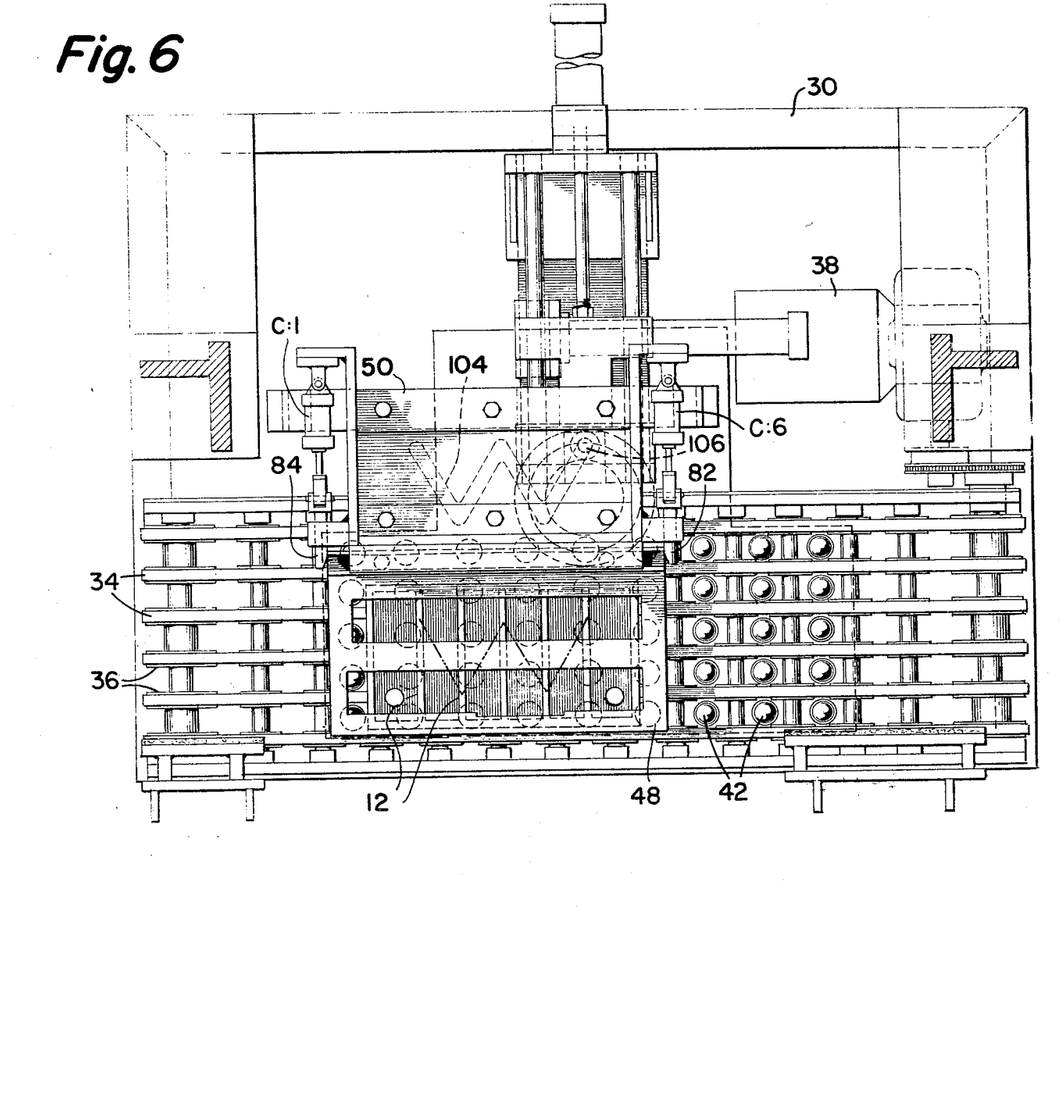
FIGURE 6 is a sectioned plan view of the machine, together with the battery and its accompanying jig plates, taken along the section line A—A shown in FIGURE 2.

The sequence of motions of the machine will now be described, beginning with the time when the battery and accompanying jig plate roll onto the belts 34 and are deflected by the guide fence 80 (FIGURES 1 and 2) into the proper horizontal position so that the cam followers 44 fit into the U-shaped channel 46 of jig plate 48. The forward motion of the battery along the "X" axis will come to a halt when the jig plate 48 bumps into the outwardly projecting stop pin 82 (FIGURES 1, 5, and 6). Simultaneously the advancing battery triggers switch S:1-2-4-8 (positioned above the cam plate 50 but having its actuator arm 51 extending downward below the cam plate to make contact with the jig plate on top of the battery, see FIGURE 9), causing shot pin 84 (FIGURES 1, 5, and 6) to extend at the rear of the battery to lock the battery in place. Motion of shot pin 84 is produced by air cylinder C:1, which functions in response to the action of switch S:1-2-4-8.

Switch S:1-2-4-8, when triggered, also causes cylinder C:2 to function, raising the table 32, risers 42 and the battery upward. The battery is lifted so that the jaws 242 and 244 engage the partition and intercell connector at Position "A," one of the five points on the Figure "W." At this time the jaws are in position for crimping.

As the piston of cylinder C:2 approaches the top of its stroke, the upward moving battery will lift the crimper mechanism to it, including the arm 207, thereby triggering switch S:3 and causing cylinder C:3 to function and crimp the intercell connector. Switch S:3, in addition to triggering cylinder C:3, also triggers a remotely located timing mechanism which regulates the time during which cylinders C:2 and C:3 are functioning; after the intercell connector is crimped and at the end of this predetermined period of time, cylinder C:3 retracts its piston and the piston of cylinder C:2 is lowered.

Figure 8:
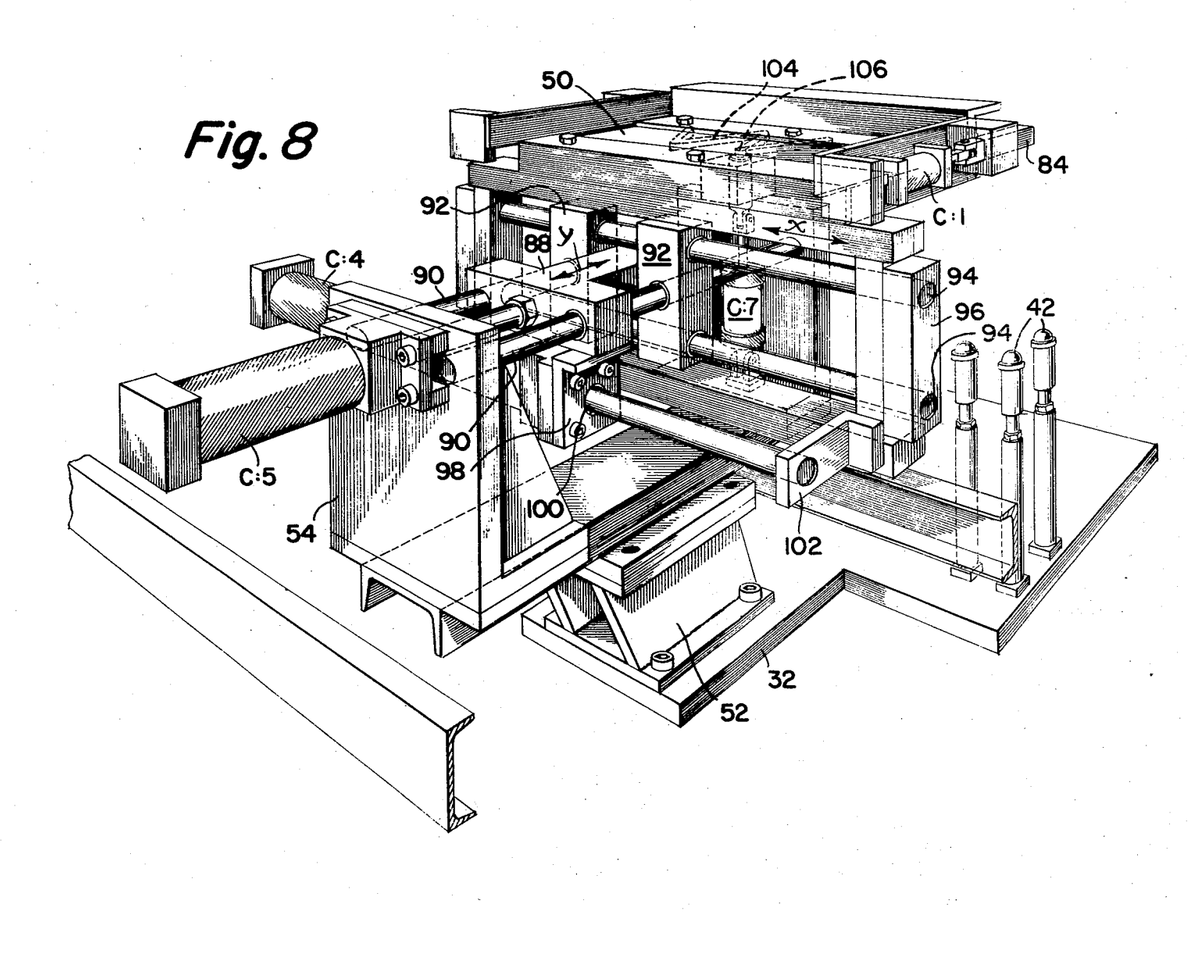
FIGURE 8 is an oblique view of the mechanism which moves the battery horizontally between crimping stations, looking from the rear of the machine toward the front.
Figure 10:
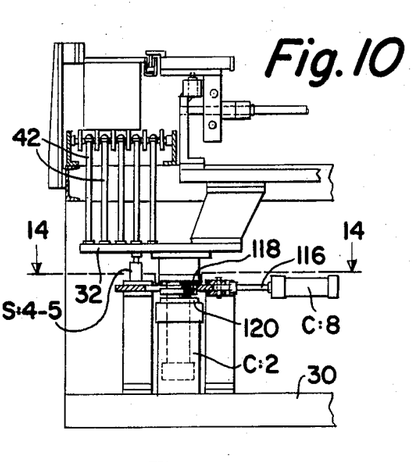
FIGURE 10 is a side elevation of a portion of the bottom of the machine, showing the piston of the main lift cylinder lowered so that its collar is below a cutout in a horizontal key.
Figure 11:
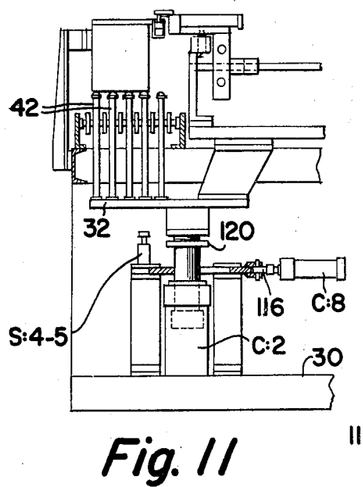
FIGURE 11 is similar to FIGURE 10, but shows the piston fully elevated and the collar above the key.
Figure 12:
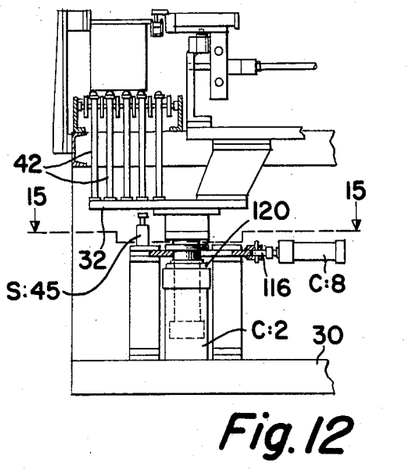
FIGURE 12 is similar to FIGURES 10 and 11, but shows the piston lowered so that the collar rests upon the key.

As the piston of cylinder C:2 lowers the battery, switch S:4-5 (located beneath table 32, as shown in FIGURES 10, 11, and 12) is triggered by the undersurface of table 32, causing two-way air cylinders C:4 and C:5 to function. As shown in FIGURE 8, cylinder C:5, the one which causes the cam plate 50 to move in the "Y" direction, is securely mounted in bracket 54, and the piston of cylinder C:5 acts against a block 88. Block 88 is free to slide along a pair of guide bars 90, and its motion is translated to tie blocks 92 through a projecting portion of block 88 which is rigidly connected to tie blocks 92. Thus tie blocks 92 may move in the "Y" direction, but not in the "X" direction.

FIGURE 8 also shows a pair of guide bars 94 which extend through, and may slide with respect to, the tie blocks 92 in the "X" direction. The ends of bars 94 are secured in the vertical portions of a frame 96 which is constructed in the form of a rectangular loop; projecting outward from the top of this frame 96 is the cantilevered cam plate 50. Extending downward from the block 88 to which it is securely attached is a bracket 98; cylinder C:4, which is oriented in the "X" direction so as to produce motion of the cam plate 50 in the "X" direction, is in turn rigidly mounted on one side of bracket 98 so that its piston may slide freely through a hole 100 in bracket 98. The end of cylinder C:4's piston is rigidly affixed to a bracket 102 projecting outward from frame 96. From this it can be seen that when cylinder C:5 is activated, its piston causes bracket 102, frame 96, guide bars 94, and cam plate 50 to move simultaneously in the "X" direction with respect to the tie blocks 92.

From the preceding it can be seen that frame 96—to which cam plate 50 is secured—will move in the "Y" direction in response to the action of cylinder C:5 and in the "X" direction in response to the action of cylinder C:4.

Figure 3:
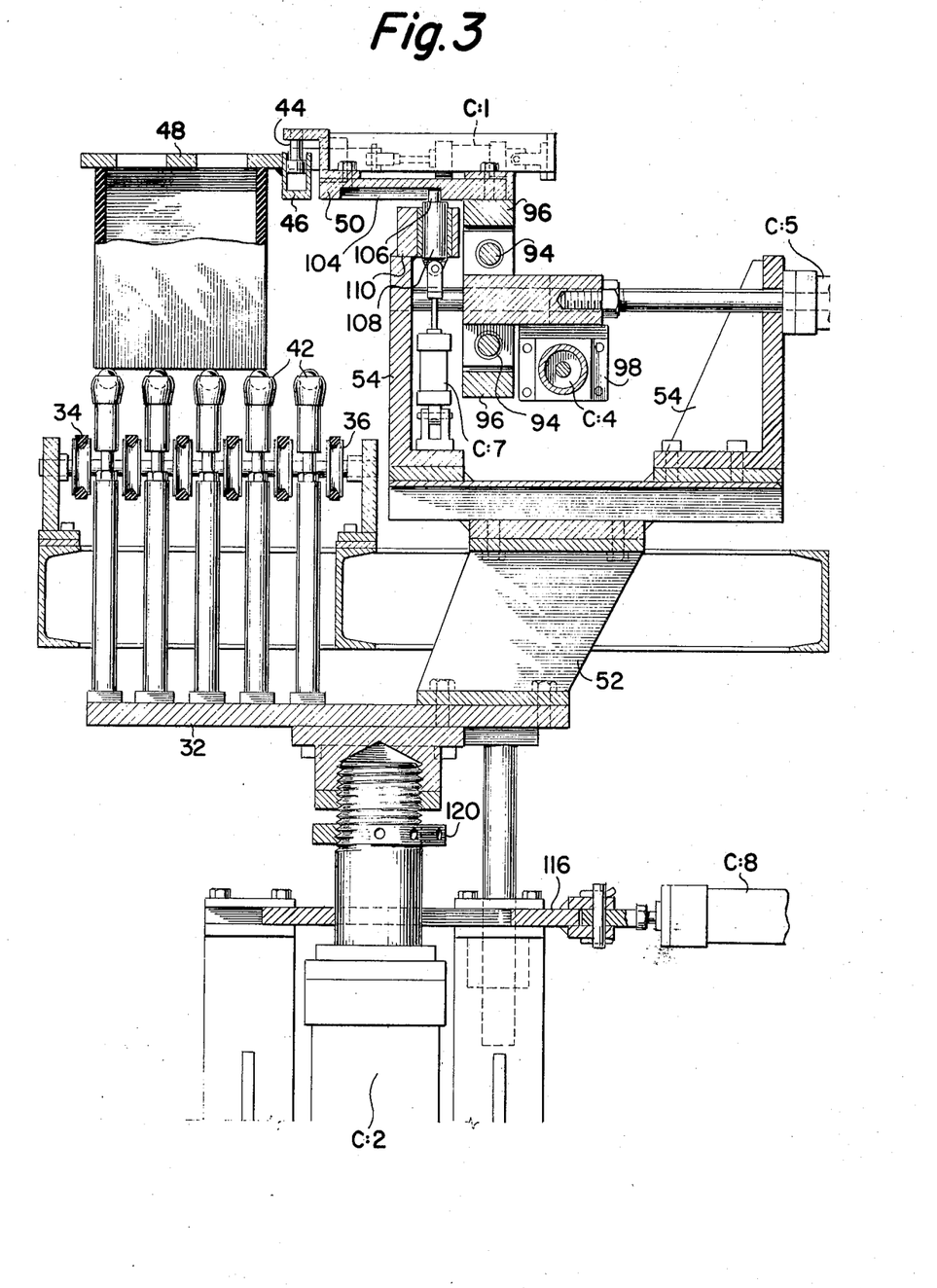
FIGURE 3 is a side elevation of a portion of the machine, with portions removed, showing the battery in its fully elevated position.
Figure 4:
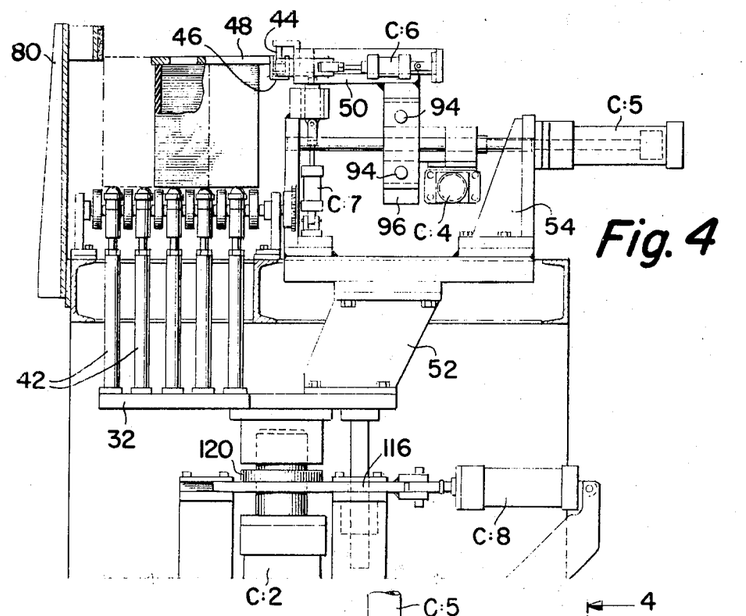
FIGURE 4 is a side elevation of a portion of the machine showing the battery in a different vertical and horizontal posiiton from FIGURES 2 and 3.

While the action of both cylinders C:4 and C:5 is initiated by the triggering of switch S:4-5, cylinder C:5 is activated after cylinder C:4; at Positions "B," "C," and "D" (see FIGURE 15), this time delay is necessary or desirable to permit a cam guide 106 to move out of the peak at that position before cylinder C:5 is activated. When both cylinders C:4 and C:5 function, as they will when switch S:4-5 is triggered, cam plate 50 will move in the horizontal "X-Y" plane along a path which is predetermined by the shape of a groove 104 cut in the underside of cam plate 50. As is shown in FIGURE 6, this groove 104 has the same "W" shape which appears in FIGURE 15. The cam plate 50 is made to follow along this W-shaped path by reason of a cam guide 106 which, as can be seen in FIGURES 3 and 6, fits into the groove 104. The cam guide 106 is at the end of a linkage 108 which slides vertically through a block 110 affixed to the top of bracket 54; this block 110 permits vertical but not horizontal motion of the linkage 108, the motion being produced at the proper time by cylinder C:7 below.

Figure 9:
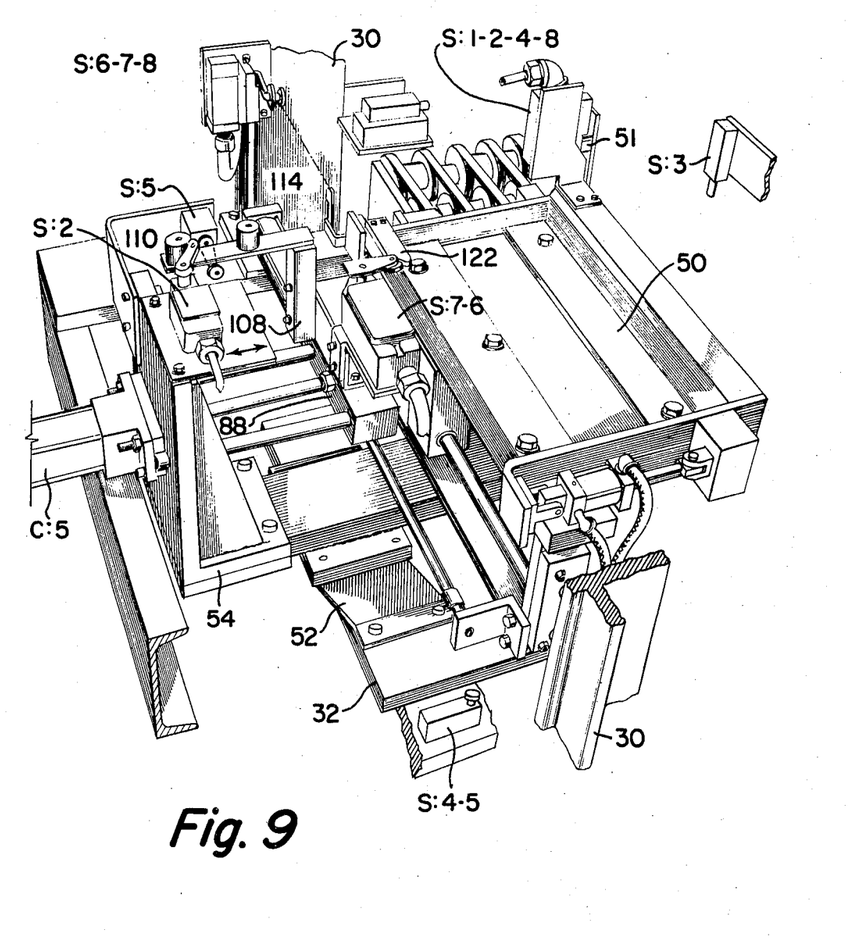
FIGURE 9 is an oblique view showing various switches in the machine.

Since the cam plate must move in the "Y" direction both toward and away from the battery as it travels its W-shaped course, something must cause the two-way air cylinder C:5 to function in the proper direction. This is done by double-action switch S:5, which is located on the side of bracket 54 as shown in FIGURE 9 and which is triggered each time the piston of cylinder C:5 reaches an extreme position of its movement. Thus, when switch S:5 is tripped in one direction, cylinder C:5 advances the cam plate in the "Y" direction toward the battery, while when switch S:5 is tripped the other way cylinder C:5 pulls the cam plate away from the battery. While one of the functions of switch S:4-5 is to cause cylinder C:5 to act at the right time, switch S:5 causes cylinder C:5 to act in the right direction.

When cylinder C:5 reaches the end of its stroke (when the cam plate has moved from Position "A" to Position "B" along its W-shaped path), the battery will be in position to have its second intercell connector crimped. Something, however, must cause cylinder C:2, the main cylinder providing vertical motion to the table 32 and risers 42, to function and raise the battery up to the crimping jaws. This is done by switch S:2, a double-action switch mounted on the top of bracket 54 (FIGURE 9). An arm 108 extending upward from block 88 has two trips, 110 and 112, which engage switch S:2 as cylinder C:5 comes to the end of its stroke in either direction along the "Y" axis. Regardless of which way switch S:2 is tripped, it causes cylinder C:2 to function and lift the battery. A new cycle of the machine then begins, with switch S:3 being triggered when cylinder C:2 approaches the top of its stroke, causing cylinder C:3 to function and crimp the next intercell connector. Successive cycles are repeated until the last of the five intercell connectors is crimped.

After the last intercell connector is crimped, at which time the cam plate will be at Position "E" along its W-shaped path, the table 32 once again begins to go down. During the descent a switch S:6-7-8, mounted on frame 96 as shown in FIGURE 9, is tripped by the downward motion of arm 114 which is attached to the cam plate 50. Tripping of switch S:6–7–8 activates cylinders C:6, C:7, and C:8, thus causing several events to occur. First, cylinder C:6 is activated, retracting the stop pin 82 (FIGURE 5) which in turn permits the constantly rotating belts 34 to carry the battery away from the machine as soon as the battery is lowered sufficiently. Secondly, since the cam plate is now ready to move from Position "E" back to Position "A" (FIGURE 15) and there is no reason to travel backwards along the W-shaped path to get back to Position "A," cylinder C:7 is activated, retracting the cam guide 106 to which its piston is connected from the groove of the cam plate; the cam plate is then free to move along a straight-line path back to Position "A." Cylinder C:8 is also activated when S:6–7–8 is triggered; however, that cylinder should be discussed separately.

Figure 13:
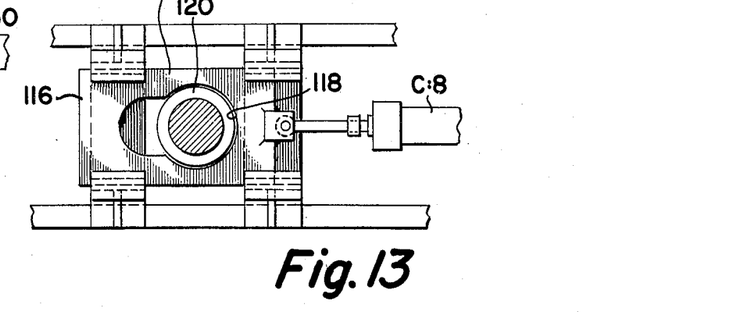
FIGURE 13 is a plan view of the main lift cylinder and the key is the position shown in FIGURE 10.
Figure 14:
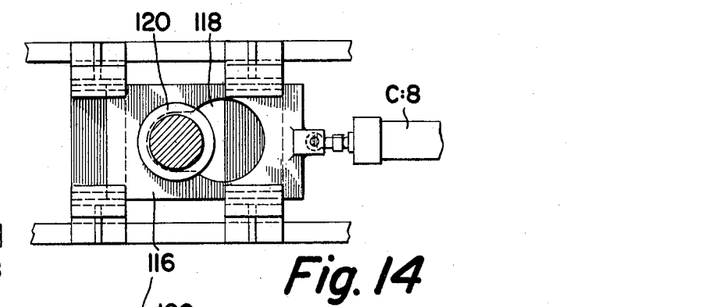
FIGURE 14 is a plan view of the main lift cylinder and the key in the position shown in FIGURE 12.

When the battery first advances onto the machine it is transported by the constantly rotating belts 34 and is lifted from the belts when cylinder C:2 first functions to raise the battery toward its first intercell connector crimp position. Although the battery must be lowered and raised again several more times before it is ready to be removed from the machine, there is no need for the battery to come down on the belts 34 since the necessary horizontal motion in the "X" direction will be transmitted to the battery through the cam plate and jig plate. Indeed, it is preferable for the battery not to be on the moving belts 34 until after the last intercell connector is poured, so that the machine does not have to overcome the force of the belts in order to prevent undesired motion of the battery in the "X" direction. With this in mind, attention is directed toward FIGURES 10 through 14, which show a slidable key 116 located in the center of the machine's frame 30 and beneath the table 32. See also FIGURES 1 through 4 for the location of this key. As shown in FIGURES 13 and 14, the key 116 has a cutout 118 in it. Both the larger and smaller portions of the cutout 118 are of sufficient size to accommodate the piston of cylinder C:2, but only the larger portion is of sufficient diameter to permit a collar 120 located on the piston of cylinder C:2 to go through the cutout 118. Horizontal sliding motion is provided to key 116 by the piston of two-way air cylinder C:8. Before a battery is received by the machine, the piston of cylinder C:2 is all the way down so that the collar 120 is below the key 116; at this time the larger portion of cutout 118 is directly above the collar. (In FIGURE 10 the battery has been received, but has not yet been lifted. See also FIGURE 13, a view taken at the same time as FIGURE 10.) When the advancing battery triggers switch S:1–2–4–8, cylinder C:2 is activated, raising the battery. Following a suitable time delay sufficient to permit the collar 120 to raise up through the cutout in the key, cylinder C:8 is activated, moving the key horizontally (FIGURE 11) so that when the piston of cylinder C:2 comes down later, the collar 120 will rest on top of the key (see FIGURE 12); the piston of cylinder C:2 will go downward through the smaller portion of the cutout, but the collar will not (FIGURES 12 and 14). The vertical descent of the piston of cylinder C:2 will thus be limited. With the collar resting on the key, the jaws 228 and 230 will clear the top of the battery permitting the battery to be moved along its W-shaped path; at the same time, the battery remains sufficiently elevated so that it doesn't rest on the revolving belts 34. After the last intercell connector is crimped, it is desirable to have cylinder C:8 function again in the reverse direction so that the collar will lower through the cutout in the key and so that the battery will be lowered to the revolving belts where it can be transported away from the machine. This last motion of cylinder C:8 is caused when switch S:6–7–8 is triggered.

The switch S:1–2–4–8 (see FIGURE 9) whose arm 51 makes contact with the jig plate on top of the battery is released when the battery advances in the "X" direction away from the machine and the switch arm 51 drops off the back of the jig plate. When switch S:1–2–4–8 is so released, cylinder C:1 activates to retract shot pin 84 and simultaneously cylinder C:4 functions, returning the cam plate along a straight-line path from Position "E" to Position "A." When the cam plate reaches Position "A," switch S:7–6 (FIGURE 9) is triggered by an arm 122 mounted from and above block 88. This causes cylinders C:6 and C:7 to again function but in reverse direction to their previous motions so that the stop pin 82 again projects outward and the cam guide 106 is inserted into the W-shaped groove of the cam plate.

At this point the machine is finished with its work on one battery and is ready to receive another. The piston of cylinder C:2 is all the way down. The stop pin 82 is extended, while shot pin 84 is retracted. The cam plate is back to Position "A," and the cam guide 106 is inserted into the groove of the cam plate.

It should now be apparent that the machine could easily be modified to crimp connectors for batteries having other than six cells, and using a cam plate having a groove other than W-shaped. The six cell automobile battery and the W-shaped cam plate groove described above have been described simply as one typical example in which the machine might find use.

While the machine's preferred application is to crimp an intercell connector which extends through a hole in the battery partition, the machine is not so limited. If for some reason it were desired to have the connector extend over the top of the partition, the machine could be easily used to crimp these connectors also.

Figure 17:
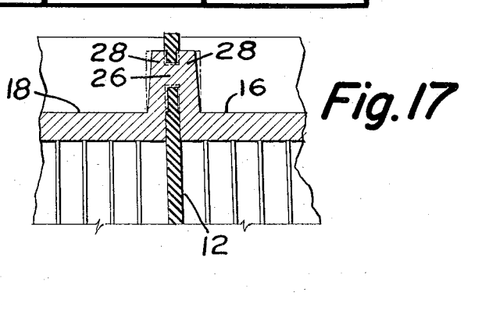
FIGURE 17 shows the intercell connector after crimping.
Figures 18, 19:
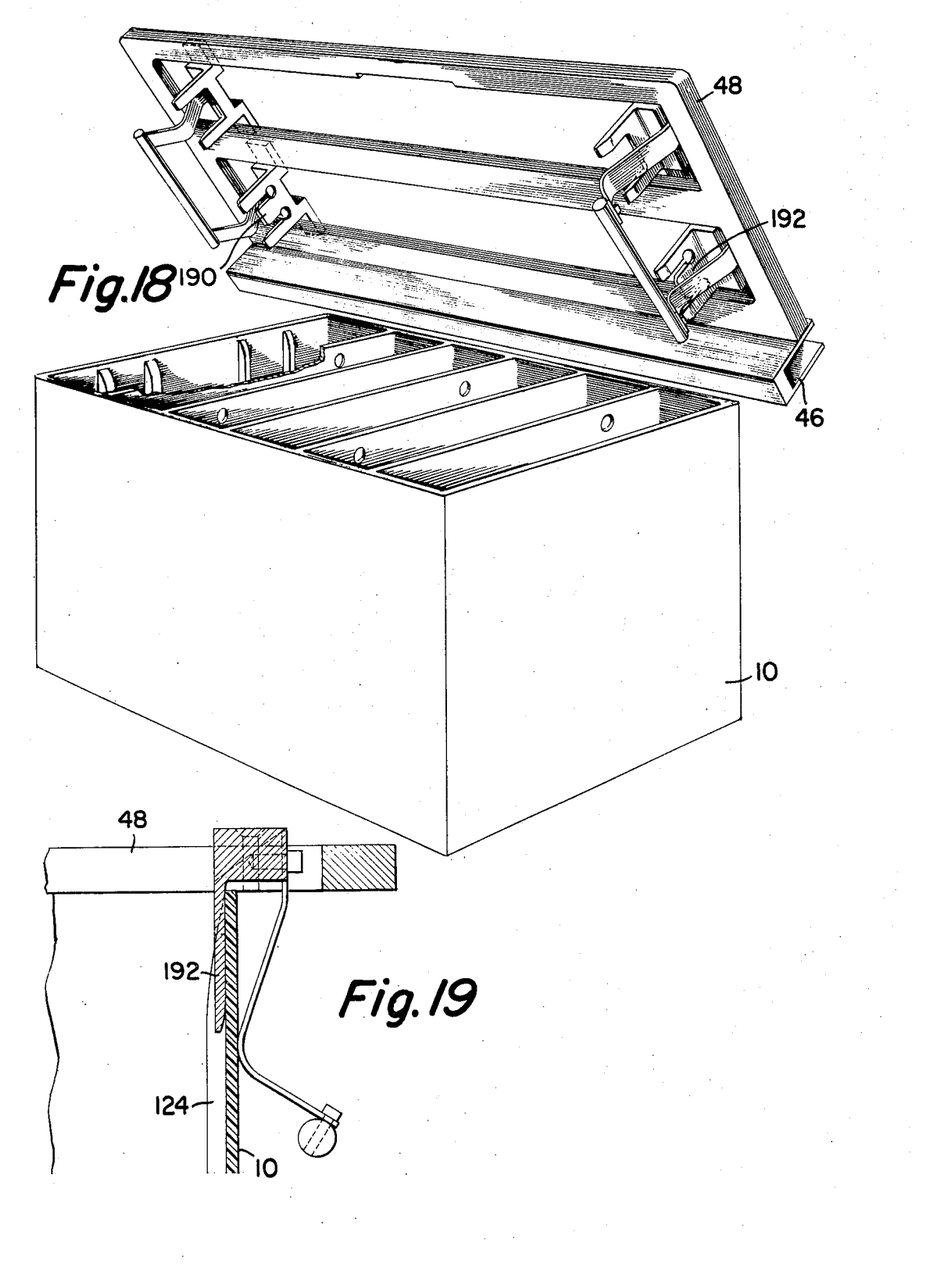
FIGURE 18 is an oblique view of the battery and its accompanying jig plate.
FIGURE 19 is a sectiontd elevation showing how the jig plate engages the end of the battery container.

An indication of the effect of crimping can be best obtained by contrasting FIGURE 16 (before crimping) with FIGURE 17 (after crimping). In FIGURE 17 the dashed lines show the position of the lead before crimping and the solid lines show a possible position afterward. As is indicated, the upstanding portions of the connector may be pressed tightly into the partition, or the lead extending through the hole 26 may be expanded to fit more snugly through the hole, or both. However the intercell connector is deformed, the result is that it fits sufficiently tightly with the partition to prevent intercell leakage of the electrolyte.

What is claimed is:
1. A machine for crimping intercell connectors of batteries comprising:
 (a) a frame;
 (b) means supported by the frame for receiving the battery container;
 (c) a crimping mechanism having jaws and being supported by the frame;
 (d) means supported by the frame for engaging the crimping jaws with the intercell connector, the means comprising
  (i) means for moving the battery container horizontally to a point beneath the jaws, and
  (ii) means for elevating the battery container so that the intercell connector is positioned between the jaws; and,
 (e) means to activate the crimping mechanism when the jaws are in engagement with the intercell connector.
2. The machine of claim 1 in which the means for moving the battery container horizontally comprise:
 (a) a cam plate supported by the frame;
 (b) means associated with the cam plate for securely engaging the battery container;
 (c) a cam guide in engagement with the cam plate; and,
 (d) means supported by the frame for causing the cam plate to move with respect to the cam guide.
3. The machine of claim 1 in which the means for elevating the battery container comprise:
 (a) a cylinder mounted in the frame and having a vertically movable piston therein;
 (b) a table mounted on the piston of the cylinder; and,
 (c) risers mounted on the table, the risers being arranged to elevate the battery container when the cylinder's piston lifts the table.

4. A machine for crimping intercell connectors of batteries comprising:
   (a) a frame;
   (b) pulleys mounted in the frame;
   (c) belts engaging the pulleys for receiving the battery container;
   (d) a motor adapted to drive the pulleys and belts;
   (e) a cylinder mounted in the frame and having a vertically movable piston therein;
   (f) a table mounted on the piston of the cylinder;
   (g) risers mounted on the table and spaced between the belts and the pulleys;
   (h) a cam plate supported by and above the table;
   (i) means associated with the cam plate for securely engaging the battery container;
   (j) a cam guide in engagement with the cam plate;
   (k) means supported by the frame for causing the cam plate to move with respect to the cam guide;
   (l) a crimping mechanism having jaws and being supported by the frame; and
   (m) means for activating the crimping jaws, in which the battery container is brought into position so that the crimping jaws are in engagement with the intercell connector by the combined movements of the cylinder piston and the means which causes the cam plate to move.

5. The machine of claim 1 wherein the crimping mechanism comprises:
   (a) a first crimping arm connected at its upper end with the upper end of a second crimping arm by a first pivot pin, which second crimping arm may rotate with respect to the first crimping arm about the first pivot pin;
   (b) an additional arm connected near its lower end with the lower arm of the second crimping arm by a second pivot pin;
   (c) a link connected to the first crimping arm by a third pivot pin and to the additional arm above the second pivot pin by a fourth pivot pin, the link being able to rotate with respect to the third or fourth pivot pins and being also able to move with respect to the second crimping arm; and,
   (d) means for applying a force to the upper end of the additional arm so as to cause the additional arm to rotate about the fourth pivot pin.

6. The machine of claim 5 wherein the crimping mechanism comprises:
   (a) a first crimping arm connected at its upper end with the upper end of a second crimping arm by a first pivot pin, which second crimping arm may rotate with respect to the first crimping arm about the first pivot pin;
   (b) an additional arm connected near its lower end with the lower arm of the second crimping arm by a second pivot pin;
   (c) a link connected to the first crimping arm by a third pivot pin and to the additional arm above the second pivot pin by a fourth pivot pin, the link being able to rotate with respect to the third or fourth pivot pins and being also able to move with respect to the second crimping arm; and,
   (d) means for applying a force to the upper end of the additional arm so as to cause the additional arm to rotate about the fourth pivot pin.

References Cited

UNITED STATES PATENTS

| 1,246,876 | 11/1917 | Casellar | 29—204 |
| 1,666,847 | 4/1928 | Cote | 29—204 |
| 1,729,843 | 10/1929 | Reich | 29—204 |
| 1,876,500 | 9/1932 | Jacobsen et al. | 29—204 X |
| 2,799,905 | 7/1957 | Vieth. | |

THOMAS H. EAGER, Primary Examiner

U.S. Cl. X.R.

29—208